Sept. 2, 1952   J. LEMBKE   2,608,816
FLEXIBLE BEATER FOR FLAILING MACHINES
Filed Aug. 2, 1950
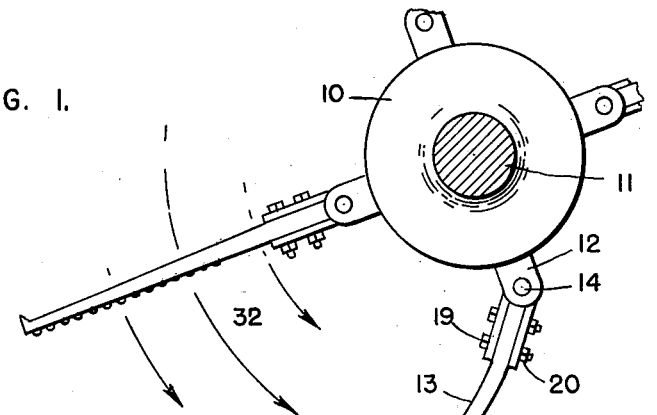
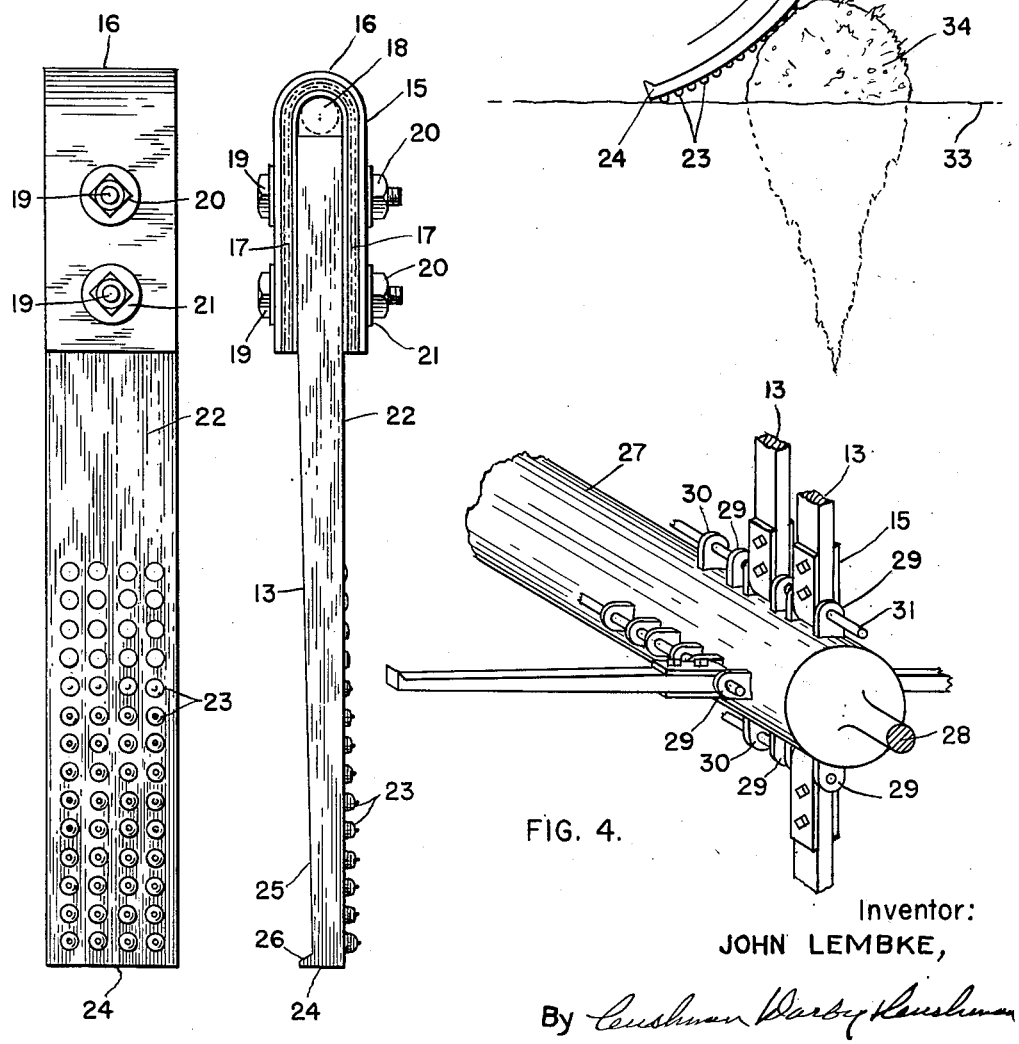
Inventor:
JOHN LEMBKE,
By Cushman Darby Cushman
Attorneys.

Patented Sept. 2, 1952

2,608,816

UNITED STATES PATENT OFFICE 2,608,816

FLEXIBLE BEATER FOR FLAILING MACHINES

John Lembke, Wilder, Idaho, assignor to Olson Manufacturing Company, Boise, Idaho, a corporation of Idaho Application August 2, 1950, Serial No. 177,304

1 Claim. (Cl. 56—121.4)

The present invention relates to an improved flexible beater for rotary flailing machines.

An important object is to provide a flexible flail having its outer or front face provided with means so as to form a coarse rasp or filing surface. Each of the flails extends radially and outwardly from the rotor or drum of the beater and is of such length that the lower end thereof strikes the ground before contacting the plant or vegetable, so that the impact of the flail is broken or reduced as it is drawn or dragged across the top of the vegetable and thus has a removing action similar in effect to that of a rasp or file.

A further object consists in providing a new and improved flail or flexible beater for removing the tops of vegetable plants and the like and which may be formed of solid or one-piece molded rubber or rubberized material to provide a relatively thick, heavy, flexible flail for removing the tops of the plants without damaging the roots or the body parts thereof. The front side or face of the flail is provided with laterally projecting beads, knobs or protuberances preferably arranged in transverse and vertical rows and which may be formed integrally with the flail. The vertical rows of the projections preferably taper in increasing lengths from an intermediate portion of the flail to the outer or free end thereof, so as to facilitate the filing action of the flail during the operation of the machine.

Other objects and advantages of the invention will become apparent from the following description when taken in conjunction with the accompanying claim and drawings.

Referring to the drawings in which is shown a preferred embodiment of the invention:

Figure 1 is a detail side view of a rotor or drum associated with a flailing machine and showing the improved flails connected thereto.

Figure 2 is an enlarged detail front view of the improved flexible flail.

Figure 3 is a side view of Figure 2, and

Figure 4 is a detail perspective view of a modified form of rotor showing the flails arranged in transverse rows and a common means for detachably connecting the flails of each transverse row.

Referring to the drawings, 10 indicates a rotor or drum of a flailing machine which may be of the type disclosed in the Agee et al. Patent No. 2,506,054, dated May 2, 1950. To the rotor is suitably keyed or otherwise non-rotatably connected the drive shaft 11 for imparting rotation to the drums during the operation of the machine. As shown in Figure 1, the outer periphery of the drum may be provided with a transverse row of spaced pairs of lugs 12 to which are detachably connected the improved flexible flails or beaters 13 by rods or pins 14. Each of the flails 13 may be formed of solid or of one piece molded rubber or rubberized material to provide a relatively thick, heavy, flexible, flat flail for removing the tops of the plants without damaging the roots or body parts thereof. The flails 13, while normally relatively rigid, are sufficiently yieldable to be brought into engagement with the ground without being damaged thereby. Preferably each flail 13 tapers lengthwise and outwardly towards its free or ground engaging end. To one end of each of the flails may be connected a flexible strap 15 (Fig. 3) which is bent intermediate its ends as at 16 so as to form the parallel spaced arms 17 and a loop opening 18 at the inner end of the flail for receiving a retaining pin or rod, such as 14. The arms 17 of the strap 15 may be secured to the flail by the spaced threaded bolts 19, nuts 20 and the interposed washers 21.

The front face or side 22 of each of the flails 13 has laterally extending projections, such as beads, knobs or the like 23 which, as shown, are formed integrally with the flail and made of the same molded rubber material. Manifestly, the projections or protuberances 23 may be made of metal or other suitable, durable material. Preferably, the projections 23 are arranged in transverse and vertical rows that extend outwardly and laterally from an intermediate portion thereof to the outer or free end 24 of the flail (Fig. 2). Additionally, the vertical rows are progressively tapered outwardly in increasing lengths towards the free end 24 so that the projections 23 nearest the end 24 extend laterally from the flail a greater distance than the projections adjacent the intermediate portion thereof. The rear, flat side 25 of each of the flails 13 may have its free end 24 formed with a transverse reinforcing flange or lug 26 (Fig. 3). It will be seen that the tapered projections 23 are so shaped and positioned along the plant contacting surface of each of the rubber flails 13 as to constitute a coarse rasp or filing surface.

In the modification shown in Figure 4, the rotor or drum 27 has its opposite ends reduced to form the bearing shafts or axles 28 to which the driving mechanism is connected for imparting rotation to the rotor during the operation of the agricultural machine. Additionally, the outer surface of the drum is formed with pairs of circumferentially spaced lugs 29 that extend around the drum and are provided with aligned openings 30 for receiving the retaining rods or pins 31 that secure the flails 13 in each transverse row to the drum when the parts are assembled. The flails may be arranged and positioned circumferentially in any suitable manner around the rotor 27 as the best operating conditions dictate. The flails are of such a length that when connected to the rotor 10 or 27, they will be of greater length than the distance of the rotor from the ground.

In operation, assuming that the rotor 10 is operatively connected to a flailing machine so as to rotate the flails 13 in the direction of the arrows 32 (Fig. 1), it will be seen that each of the flails 13 is of such a length relative to the ground 33 that it will be set so that the end 24 of the flail strikes the ground 33 before contacting the plant or vegetable, such as a sugar beet 34, with the result that the impact of the flail is broken or reduced by its engagement with the ground and the flail assumes the arcuate or convex shape as particularly shown in Figure 1, so that the tapered projections 23 are drawn or dragged across the top of the beet 34 with an operating effect similar to that imparted by a course rasp or file. Thus, the action of the flexible rubber flail is different from that of a standard flexible beater and insures the removal of the tops of the vegetable plants without damage to their roots, in an efficient and thorough manner. The length of the flails may be adjusted by mounting the flail rotor or an agricultural machine such as embodied in the said Agee et al. Patent No. 2,506,054.

It will be understood that the forms of the invention shown are merely illustrative of preferred embodiments and that such changes may be made within the scope of the following claim.

I claim:

A rotary beater for a flailing type beet topper supported above the ground with its axis substantially parallel thereto, said rotary beater including flexible flails extending outwardly and radially therefrom, each of said flails having spaced bead-like projections extending outwardly and laterally from the front side thereof, said bead-like projections being arranged in transverse and vertical rows and tapering outwardly so that the projections increase in length toward the outer ends of the flail, the length of each flail being longer than the distance of the rotary beater from the ground, so that the outer end thereof strikes the ground before the flail contacts the vegetable or beet tops in order to break the impact and be arcuately bent to cause the projections to be drawn upwardly and across the adjacent side and top of the vegetable with progressively increasing filing action.

JOHN LEMBKE.

REFERENCES CITED

The following references are of record in the file of this patent:

UNITED STATES PATENTS

| Number | Name | Date |
| --- | --- | --- |
| 2,184,132 | Todd | Dec. 19, 1939 |
| 2,456,757 | Valenta | Dec. 21, 1948 |
| 2,504,365 | Wallace | Apr. 18, 1950 |
| 2,505,089 | Bailey | Apr. 25, 1950 |
| 2,524,942 | Tomlinson | Oct. 10, 1950 |

FOREIGN PATENTS

| Number | Country | Date |
| --- | --- | --- |
| 486,976 | Great Britain | June 14, 1938 |